United States Patent [19]
Elmore et al.

[11] 3,916,897
[45] Nov. 4, 1975

[54] COLOSTOMY IRRIGATION DEVICE

[76] Inventors: Austin E. Elmore, 8519 E. Pasadena Ave.; Ernest A. Uhlmann, 4533 N. Scottsdale Road, both of, Scottsdale, Ariz. 85251

[22] Filed: June 4, 1971

[21] Appl. No.: 150,031

[52] U.S. Cl. ............................... 128/245; 128/283
[51] Int. Cl.² .......................................... A61M 3/00
[58] Field of Search ........... 128/245, 244, 241, 239, 128/251, 283

[56] References Cited
UNITED STATES PATENTS

| | | | |
|---|---|---|---|
| 350,105 | 10/1886 | Bennett | 128/245 |
| 426,047 | 4/1890 | McClellan et al. | 128/245 X |
| 1,494,985 | 5/1924 | Beck | 128/251 |
| 1,666,684 | 4/1928 | Carstens | 128/244 |
| 2,176,391 | 10/1939 | Chalmers | 128/245 |
| 2,331,226 | 10/1943 | Pritchard | 128/283 |
| 2,434,327 | 1/1948 | McArdle | 128/283 |
| 2,888,925 | 6/1959 | Philips | 128/251 |
| 3,543,744 | 12/1970 | LePar | 128/283 X |
| 3,577,982 | 5/1971 | LePar | 128/245 |
| 3,581,732 | 6/1971 | Ruiz | 128/245 |

*Primary Examiner*—Richard A. Gaudet
*Assistant Examiner*—J. Yasko
*Attorney, Agent, or Firm*—Warren F. B. Lindsley

[57] ABSTRACT

A colostomy stoma irrigation device of special conical shape utilizing a tapered cone with catheter for insertion to required depths so as to irrigate with greater ease. The irrigation device is provided with means for holding or for attachment to a belt for maintaining the irrigation device in the stoma opening during use.

9 Claims, 10 Drawing Figures

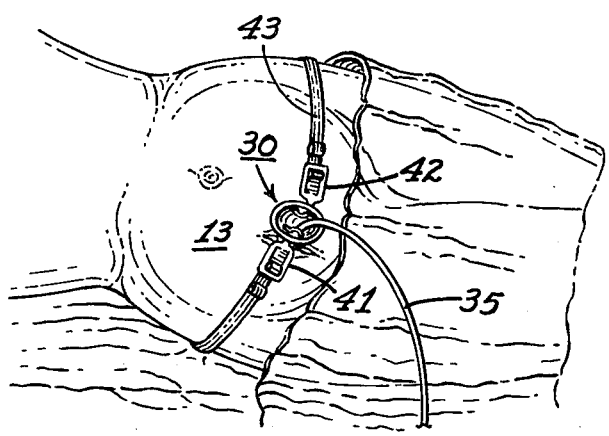
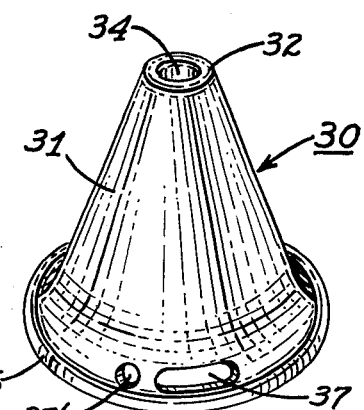
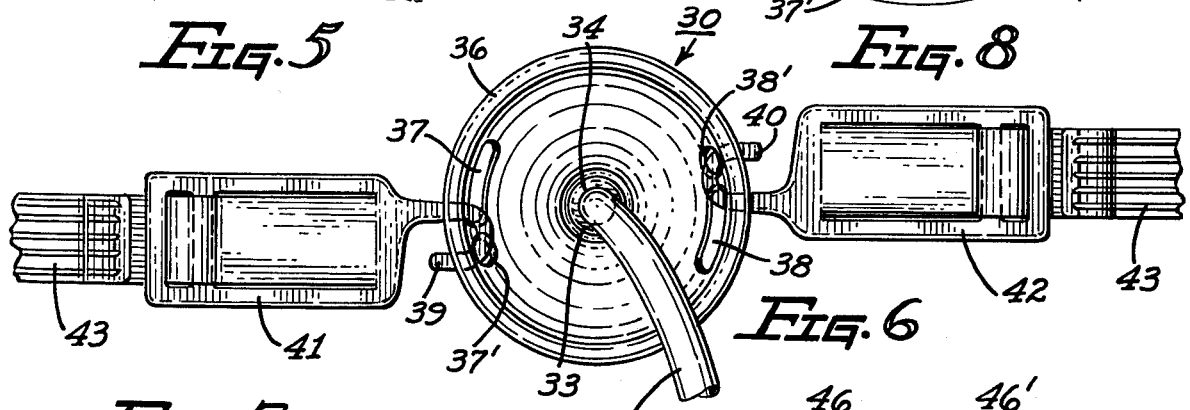
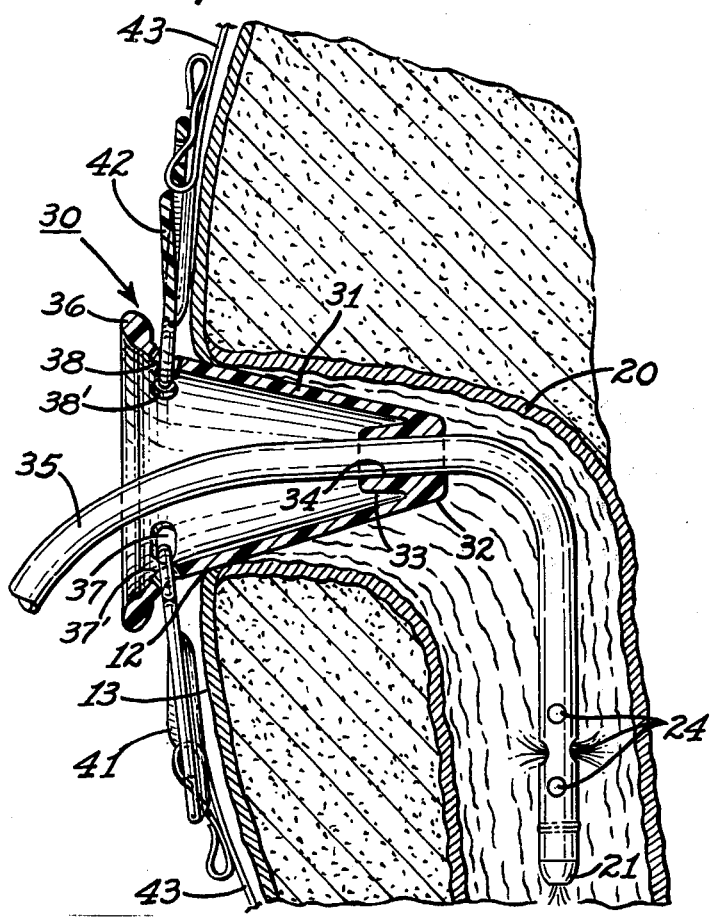
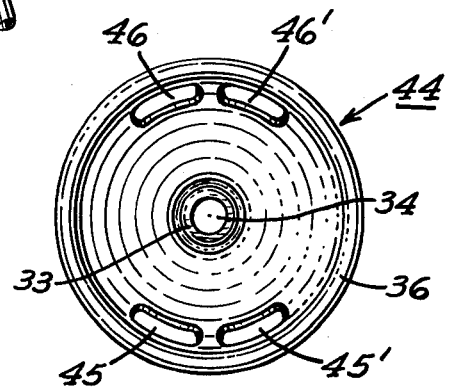
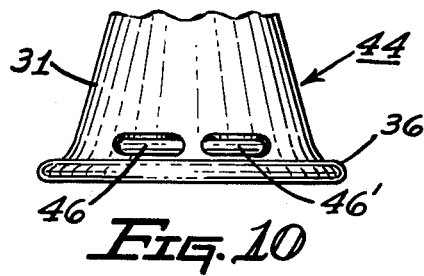

COLOSTOMY IRRIGATION DEVICE

BACKGROUND OF THE INVENTION

This invention pertains to medical and patient care apparatus, and is particularly directed to a colostomy stoma irrigation device.

Because of the variations in the sizes of the stoma openings in patients of all sizes and ages, it has been difficult to provide an appliance of a single configuration for patients to use comfortably in conducting the usual colostomy irrigation. This has been due to the difficulty in placing the prior art devices in the colostomy stoma openings to reach into various positions in the colon of the user. Further, it has been difficult with the prior art devices to hold them in the stoma opening during use.

SUMMARY OF THE INVENTION

In accordance with the invention claimed a new and improved colostomy stoma irrigation device is provided which comfortably achieves dilation of the colon opening and by its new design aids the user in holding the device in a number of predetermined depths in the colon.

It is, therefore, one object of this invention to provide a colostomy stoma irrigation device which is readily adapted to large or small abdominal stoma openings and employs a catheter readily insertable to various depths in the colon.

Another object of this invention is to provide a colostomy irrigation device employing a catheter that can be manipulated with ease and comfort by the patient.

A further object of this invention is to provide a colostomy irrigation device which can be used as a regular irrigation tip without an extension catheter or as an irrigation tip with the use of an extension catheter when necessary to enter the colon a plurality of predetermined distances.

A still further object of this invention is to provide a new colostomy irrigation device employing a means for holding the device in the stoma opening.

A still further object of this invention is to provide an irrigation device the cone of which may be readily attached to a belt.

A still further object of this invention is to provide an irrigation device the cone of which may be used with or without a belt and may be attached or detached from a belt without removing the device from the stoma opening.

A still further object of this invention is to provide a colostomy irrigation device which may be used for rectal irrigation.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described by reference to the accompanying drawing in which:

FIG. 5 is a modification of the colostomy stoma irrigation device shown in FIGS. 1–4 wherein the device is adapted to be attached and detached from a belt worn around the torso of a user;

FIG. 6 is an enlarged front view of the irrigation device and associated belt shown in FIG. 5;

FIG. 7 is a cross-sectional view of the irrigation tip and catheter shown in FIG. 5 and inserted in a colon;

FIG. 8 is a perspective view of the colostomy stoma irrigation device shown in FIGS. 5–7;

FIG. 9 is a front view of a modification of the irrigation device shown in FIGS. 5–8 wherein the attachment means comprises two arcuately aligned slots; and FIG. 10 is a side view of FIG. 9.

DESCRIPTION OF THE PREFERRED EMBODIMENT

Figure 1:
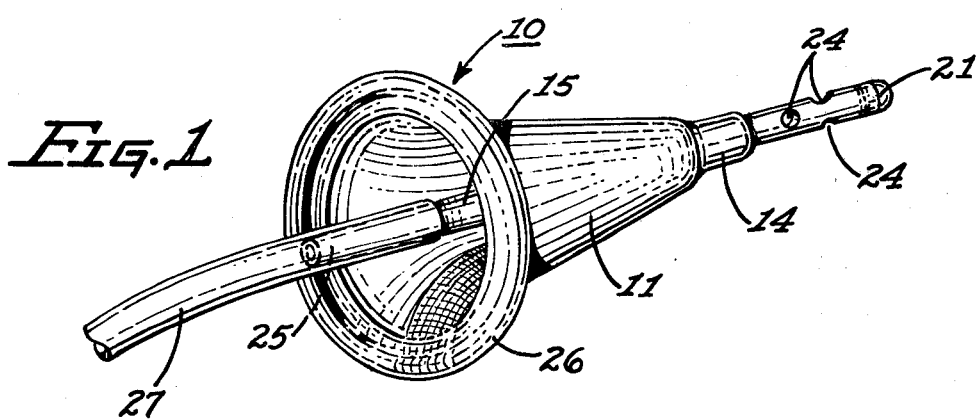
FIG. 1 is a perspective view of a colostomy stoma irrigation device incorporating the features of this invention.
Figure 2:
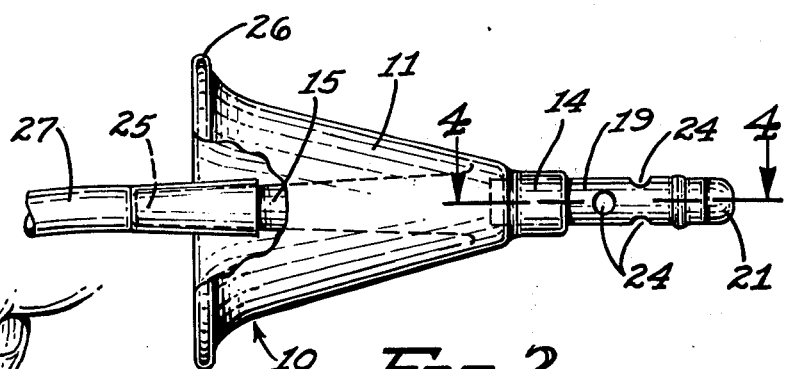
FIG. 2 is a side elevation partly broken away of the irrigation tip and catheter shown in FIG. 1.
Figure 3:
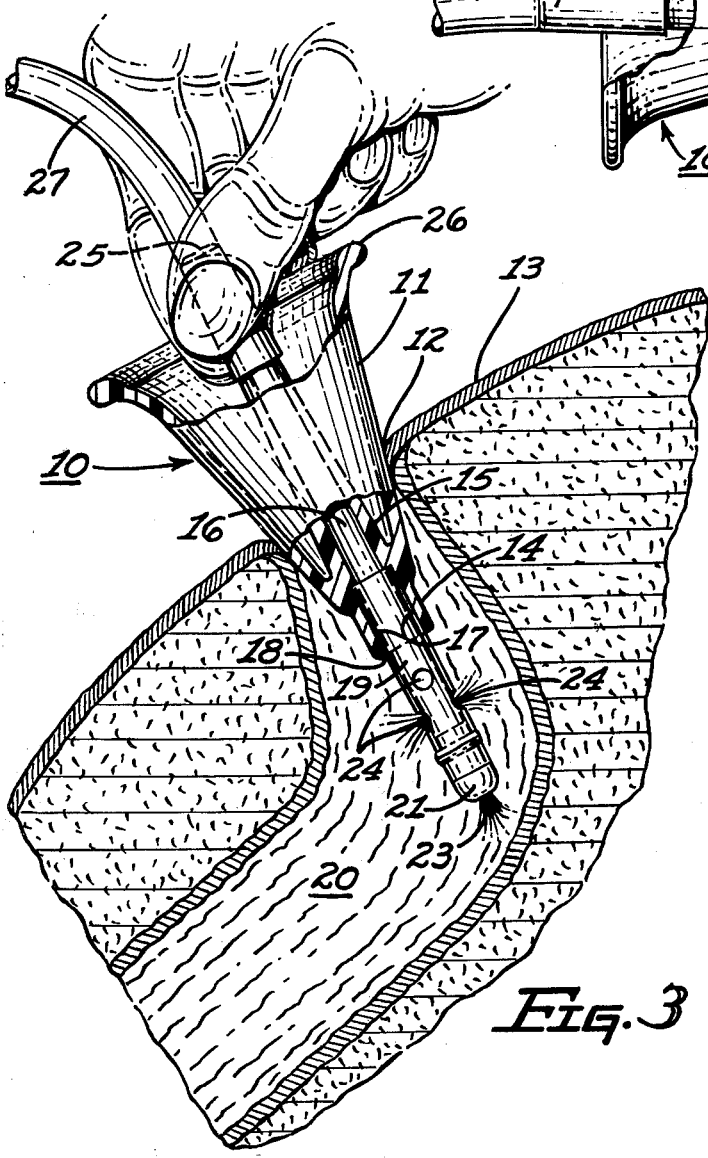
FIG. 3 is a view partially in cross section showing the irrigation device inserted in a stoma opening in a colon.
Figure 4:
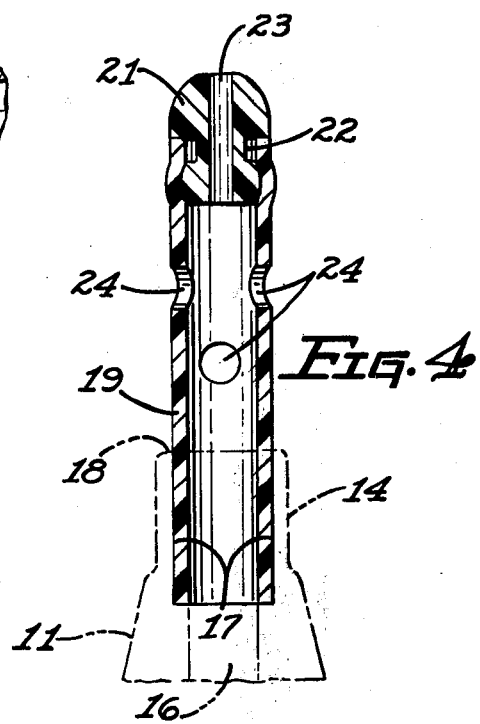
FIG. 4 is an enlarged fragmentary cross sectional view of the catheter tip shown in FIG. 2 taken along the line 4—4.

Referring more particularly to the drawing by characters of reference, FIGS. 1–3 illustrate a stoma irrigation device 10 having a conical outside surface 11 adapted to engage various size stoma openings 12 in the abdomen 13 of a patient. Although device 10 is shown for use in a stoma opening it may be used for rectal irrigation if so desired.

Formed integral with the small inner end 14 of the conical outer surface 11 is an outwardly projecting central coaxially positioned stem 15. Stem 15 is arranged to project outwardly of device 10 and is provided with a bore 16 having an enlarged opening 17 at its inner end 18 into which an extension catheter tube 19 may be inserted into a colon 20 of the patient, the catheter tube 19 having a sliding sealing fit in the opening 17 of stem 15.

As shown in FIGS. 1–4 of the drawing, catheter tube 19 is provided with a rounded tip 21 of substantially the same outside diameter as the catheter tube and has a shank 22 for snugly fitting into the end of catheter tube 19. Tip 21 is provided with an opening 23 extending through the tip longitudinal thereof so as to provide an extension of the hollow interior of the catheter tube.

A plurality of apertures 24 are provided in the catheter tube 19 adjacent tip 21 to aid in irrigating the colon.

The stoma irrigation device disclosed provides a means for extending a catheter into the colon of the patient any distance required depending on the length of the tube to comfortably irrigate the patient. The irrigating head or tip of hard plastic material on the catheter effectively disperses the irrigating liquid in all directions in the colon.

The outer end 25 of stem 15 may extend outwardly of the flared surface 26 of device 10 to serve as a hand grip for the user, as shown in FIG. 3.

In order to furnish a suitable flushing liquid to the stoma irrigation device 10, a hollow plastic or rubber tubing 27 is slidably fitted over the end 25 of stem 15 and connected to a suitable source of liquid, not shown.

FIGS. 5–8 disclose a modification of the irrigation device shown in FIGS. 1–4 wherein the stoma irrigation device 30 comprises a conical outside surface 31 adapted to engage various size stoma openings 12 at the surface of the abdomen 13 of a patient. Device 30, as shown in FIGS. 5–7, has formed integral with its small inner end 32 of the conical outside surface 31 an outwardly projecting central coaxially positioned stem 33. Stem 33 is arranged to project outwardly of device 30 only a small portion of its length and is provided with a bore 34.

As shown in FIGS. 6–9, the large flange outer end 36 of device 30 is provided with a rim around its periphery having a surface turned outwardly to overlap the periphery of the stoma opening of the patient.

Two pairs of diametrically disposed slots 37, 37' and 38, 38' are positioned adjacent the rim within the conical outside surface of the body of device 30. Slots 37' and 38' are substantially smaller than slots 37 and 38 so as to hold firmly the hook ends 39 and 40 of belt buckles 41 and 42. Belt buckles 41 and 42 are each attached to opposite ends of a belt 43 in any suitable manner so as to firmly grip the belt but at the same time be easily adjusted for lengthening or shortening the belt to fit the user.

As shown in FIGS. 6 and 7 the hook ends 39 and 40 of the belt grip the device 30 by entending underneath the peripheral edge of its outer end 36 through the large slots 37, 38 and out of the smaller slots 37' and 38'. Since the smaller slots are slightly larger than the hook ends of the belt buckles the buckles will firmly grip and hold device 30 without rotative movement of the device in the stoma opening.

FIGS. 9 and 10 show a modification of the irrigation device 30 as shown in FIGS. 5–8 wherein device 44 differs only in that slots 37, 37' and 38, 38' of device 30 are replaced with slots 45, 45' and 46, 46' of substantially equal size.

Although but a few embodiments of the present invention have been illustrated and described, it will be apparent to those skilled in the art that various changes and modifications may be made therein without departing from the spirit of the invention or from the scope of the appended claims.

I claim:

1. A colostomy irrigation device comprising in combination:
   a body having,
   a conical outside surface defining a smaller inner end adapted to engage various sized stoma openings in the abdomen of a patient and a large outer end,
   an outwardly projecting central coaxially positioned stem formed integral with the small inner end of the conical outer surface of the body and projecting outwardly of the large outer end of said body,
   a bore in said stem arranged to receive at the body's smaller inner end in sliding fluid tight arrangement a catheter tube for insertion into a colon of the patient, and
   a catheter tube slidably arranged on said stem at the small inner end of said body for receiving liquid.

2. The colostomy device of claim 1 wherein said catheter tube is provided with a round tip having an opening therethrough extending longitudinally of the catheter tube and at least one aperture extending laterally of said catheter tube.

3. The device of claim 1 useable for rectal irrigation wherein said catheter tube is provided with an apertured tip insertable in the end of said tube and wherein said tube is provided with a plurality of apertures adjacent said tips.

4. The colostomy irrigation device of claim 1 wherein said openings comprise two pairs of arcuate openings extending around the periphery of said conical outside surface, each pair being diagonally positioned from the other.

5. The colostomy irrigation device of claim 4 wherein each pair of openings comprises a small opening of sufficient size to receive only the hook end of a buckle and said stem extends only a portion of the body's length.

6. A colostomy irrigation device comprising in combination:
   a body having,
   a conical outside surface defining a smaller inner end adapted to engage various sized stoma openings in the abdomen of a patient and a large outer end,
   an outwardly projecting central coaxially positioned stem formed integral with the small inner end of the conical outer surface of the body and projecting outwardly of the large outer end of said body, and
   a bore in said stem arranged to receive at the body's smaller inner end in sliding fluid tight arrangement a catheter tube for insertion into a colon of the patient,
   said body being provided with openings diagonally positioned along the larger end of its conical outer surface for receiving buckles of a belt.

7. The colostomy irrigation device of claim 1 wherein the conical outside surface is provided with a rim at its larger end having a surface turned outwardly to overlap an opening in a patient, and said openings are positioned adjacent said rim within the conical outside surface of said body.

8. The colostomy irrigation device of claim 1 in further combination with a belt of adjustable length having a buckle at each end, each of said buckles having a hook end for hooking through a pair of said openings.

9. The colostomy irrigation device of claim 5 in further combination with a catheter tube slidably arranged in said stem for extending a predetermined distance through said device.

* * * * *